No. 640,784. Patented Jan. 9, 1900.
H. F. LOWE.
BICYCLE SUPPORT.
(Application filed May 26, 1899.)
(No Model.)
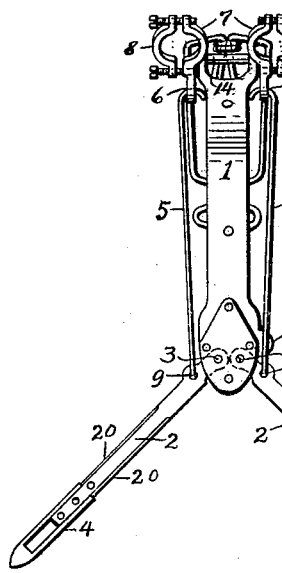
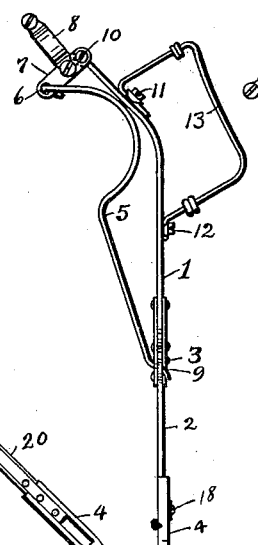
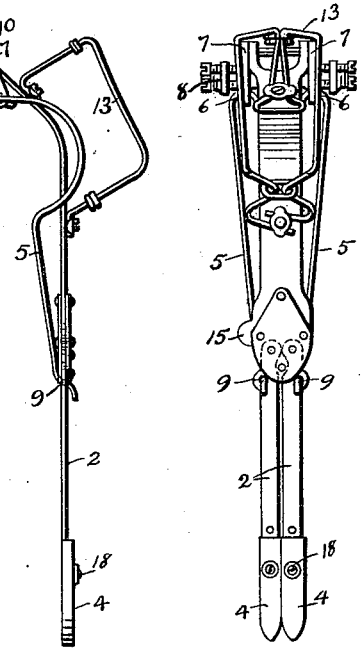
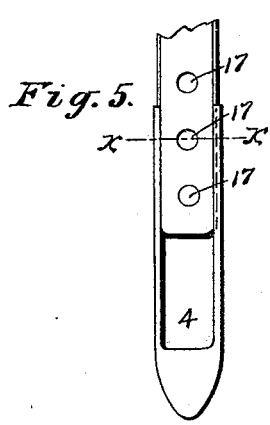
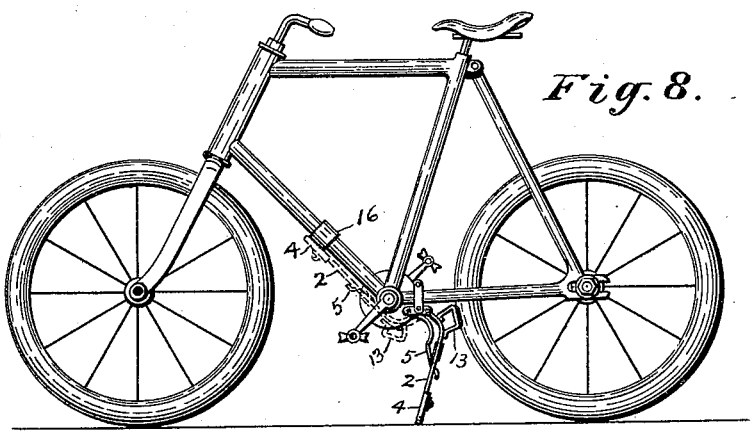
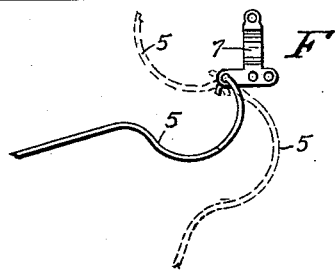
WITNESSES:
A. D. Allen
R. G. Moran
INVENTOR
Henry F. Lowe
BY D. B. Replogle
ATTORNEY
THE NORRIS PETERS CO., PHOTO-LITHO., WASHINGTON, D. C.

UNITED STATES PATENT OFFICE.

HENRY F. LOWE, OF WILKES-BARRÉ, PENNSYLVANIA.

BICYCLE-SUPPORT.

SPECIFICATION forming part of Letters Patent No. 640,784, dated January 9, 1900.

Application filed May 26, 1899. Serial No. 718,365. (No model.)

*To all whom it may concern:*

Be it known that I, HENRY F. LOWE, a subject of the Queen of Great Britain, residing at Wilkes-Barré, in the county of Luzerne and State of Pennsylvania, have invented certain new and useful Improvements in Bicycle-Supports, of which the following is a specification, reference being had therein to the accompanying drawings.

This invention relates to that class of bicycle-supports which are designed to be attached to a portion of the frame and carried with the bicycle to be used by the rider for the purpose of standing the bicycle up anywhere without the trouble of finding any other support.

The object of the invention is to provide a bicycle-support of such construction that it will serve to support the bicycle in the vertical position, to lock the rear wheel at the operation of putting the support into position, and to provide a device for folding said support into a small compass in an out-of-the-way position on the bicycle-frame.

To this end the device consists of the construction, combination, and arrangement of parts, as herein specified, and illustrated in the accompanying drawings, in which—

Figure 1 is a front view of my device detached from the bicycle-frame and swung into the open position which it occupies when in use. Fig. 2 is a view of the same, taken at right angles to that of Fig. 1. Fig. 3 is a side view of my support when folded and not in use. Fig. 4 is a rear view of the device in the condition shown in Fig. 3. Fig. 5 is a detail view of the extensible attachment used on the legs of my device. Fig. 6 is a cross-section taken on the line $x\ x$ of Fig. 5. Fig. 7 is a detail view designed to illustrate the operation of the spring used in my device. Fig. 8 is a general view illustrating the method of attachment and operation of my device in connection with a bicycle.

Similar figures of reference denote like and corresponding parts throughout the several views.

Referring to the drawings, 1 designates the main or body portion of my device, to which a pair of legs 2 2 are pivoted at 3 3, the said legs having extensible ends 4 4, adapting them to adjustment suitable for the different heights of bicycles on which the device is to be used. A pair of springs 5 5, serving as levers, are pivoted to the legs at 9 9 and also to the members 7 7 at 6 6. The members 7 7 are T-shaped, one portion thereof coöperating with the members 8 8 in forming clips whereby the device is fastened to the frame of the bicycle. The member 7 is most distinctly shown in the view in Fig. 7. The main plate or body portion 1 of the device is pivoted to the member 7 at 10 by means of a bolt 14, extending through lugs at the upper end of the piece. The said piece is also provided with a small extension 15, to which the foot of the user may be applied in bringing the device into action. A rubber ring or band 16 on the bicycle-frame serves as a rest for the tips or end pieces 4 of the device when it is folded up. The legs 2 are beveled at 20 20, so as to slide in the members 4 4. A threaded screw 18, threaded into the embossed portion 19, engages with any one of a plurality of holes 17 in the leg portion of the device. Adjustments may also be made by using the said screw 18 as a set-screw, if desired, between the holes made for it, so that any desired length may be given to the legs. A bridge-like member 13 is rigidly secured to the main portion of the device at 11 and 12 and is adapted to extend backward and be pressed into engagement with the tire of the rear wheel when the device is in use.

The operation of the device may now be readily explained. By means of the clips it is secured to the rear forked portion of the bicycle intermediate of the sprocket and rear wheel, near enough to the rear wheel so that when the main portion of the device is swung into a vertical or nearly vertical position the bridge 13 presses into contact with the tire of the rear wheel, thus assisting to hold the wheel steady while the legs of the device engage with the ground and prevent tipping sidewise. The adjustment should also be such that the curved portions of the springs 5 will assist them in clearing the bracket or journal bearings of the sprocket-shaft on the frame of the bicycle when the device is bent upward in the position shown in dotted lines in Fig. 8. The spring 5 serves as a lever as well as spring in the operation of the device. It will be noticed that the main portion of the device swings from the pivot 10 as a center, while the spring itself swings from the pivot 6, so that the curved portion thereof is bent into a sharper curve when the outer end of the device is swung around so as to extend up on the frame, and the main or body portion of the device is also curved near its upper end to clear the journal-bearing aforesaid in the vicinity in which the spring is curved. The attachment of the spring is such that in swinging the device up into position, as shown in dotted lines in Fig. 8, the spring 5 has the greatest tension brought on it intermediate of the two positions, and the tension of the spring holds the device tight against the stop 16; but when it is pressed beyond the point of greatest tension in the spring the device springs on downward until the tension of the spring is not only relieved, but the tension is exerted in the opposite direction, so as to draw upward at the pivots 9 9, thus throwing the legs of the device outward into the position shown in Fig. 1, in which position it also engages with the rear bicycle-wheel. By this particular shape of spring and its connections I economize in space and material in making an effective support.

Having thus described my invention, what I claim, and desire to secure by Letters Patent, is—

1. In a bicycle-support of the kind described, a main or body portion having a pair of legs hinged thereto, the said body portion pivoted to clips, whereby it is secured to the forks of a bicycle-frame, spring members pivoted to another portion of said clips, and said spring members extending to and pivoted to portions of the legs aforesaid, for the purpose specified and substantially as set forth.

2. The herein-described bicycle-support consisting of a main or body portion pivoted to clips, the said clips adapted to secure the said device to the frame of a bicycle, a pair of legs pivoted to said body portion and a pair of curved levers pivoted to another portion of the clips aforesaid and also pivoted to eyes in the legs aforesaid, whereby the said device is adapted to be swung upward or downward, and adapted to cause the curved levers aforesaid to be constrained so as to separate and close the legs of the device in the different changes of position, substantially as specified.

3. In a bicycle-support of the kind described, clips adapted to secure the said support to the bicycle-frame, a main portion hinged to said clips and curved to conform to the journal-bearings of the crank-shaft, a pair of legs pivoted to said main portion and a pair of springs extending to pivotal points in said legs, from pivotal points in the clips aforesaid other than those to which the main body is pivoted, the said springs adapted to serve as levers in separating and closing the legs aforesaid, and the said legs adapted to be closed when the device is folded up and adapted to be spread apart automatically when the device is swung into use, substantially as specified.

4. In a bicycle-support of the kind described, a main or body portion having a pair of legs hinged thereto, the said body portion pivoted to clips whereby it is secured to the forks of a bicycle-frame, spring-lever members pivoted to other portions of said clips and extending to pivotal points in the legs aforesaid, the said legs being provided with extensible ends to adjust them to different lengths, and being adapted to be spread by the action of the spring-levers aforesaid and to engage with the ground in said condition so as to support the bicycle in a vertical position substantially as specified.

In testimony whereof I affix my signature in presence of two witnesses.

HENRY F. LOWE.

Witnesses:
A. D. ALLEN,
D. G. MORAN.